(12) United States Patent
Copley

(10) Patent No.: US 7,023,977 B2
(45) Date of Patent: Apr. 4, 2006

(54) METHOD AND SYSTEM FOR PROVIDING SOFTSWITCH FAILURE PROTECTION IN A COMMUNICATION NETWORK

(75) Inventor: Jeffrey D. Copley, Garland, TX (US)

(73) Assignee: Alcatel, Paris (FR)

( * ) Notice: Subject to any disclaimer, the term of this patent is extended or adjusted under 35 U.S.C. 154(b) by 618 days.

(21) Appl. No.: 10/320,247

(22) Filed: Dec. 16, 2002

(65) Prior Publication Data

US 2004/0114748 A1    Jun. 17, 2004

(51) Int. Cl.
*H04M 7/00* (2006.01)
(52) U.S. Cl. ............ 379/221.03; 379/219; 379/220.01; 379/221.01; 379/221.1
(58) Field of Classification Search ............... 379/219, 379/220.01, 221.01, 221.03, 221.1, 268, 379/273
See application file for complete search history.

(56) References Cited

U.S. PATENT DOCUMENTS 6,614,781 B1 * 9/2003 Elliott et al. ................ 370/352

* cited by examiner

*Primary Examiner*—Bing Q. Bui
(74) *Attorney, Agent, or Firm*—Craig A. Hoersten; V. Lawrence Sewell

(57) ABSTRACT

A method for providing softswitch failure protection in a communication network is provided that includes assigning an alias point code to a first softswitch. The alias point code is also assigned to a second softswitch. A message is generated that comprises a destination point code that is operable to identify a destination for the message. The destination point code comprises the alias point code.

20 Claims, 3 Drawing Sheets

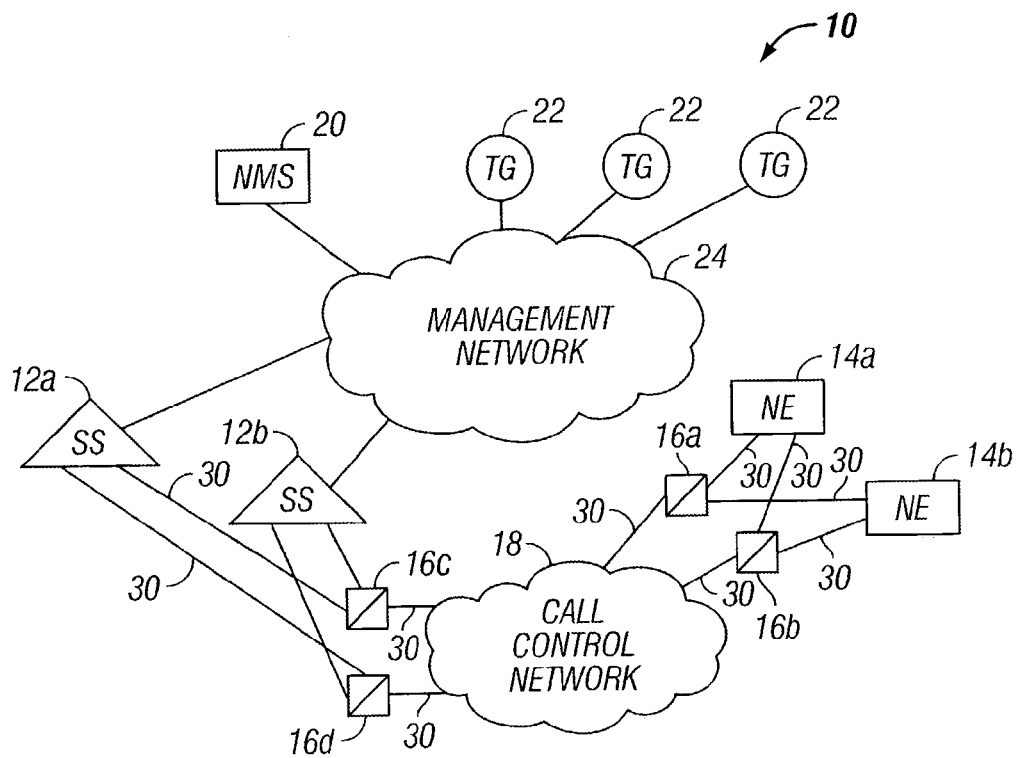
FIG. 1
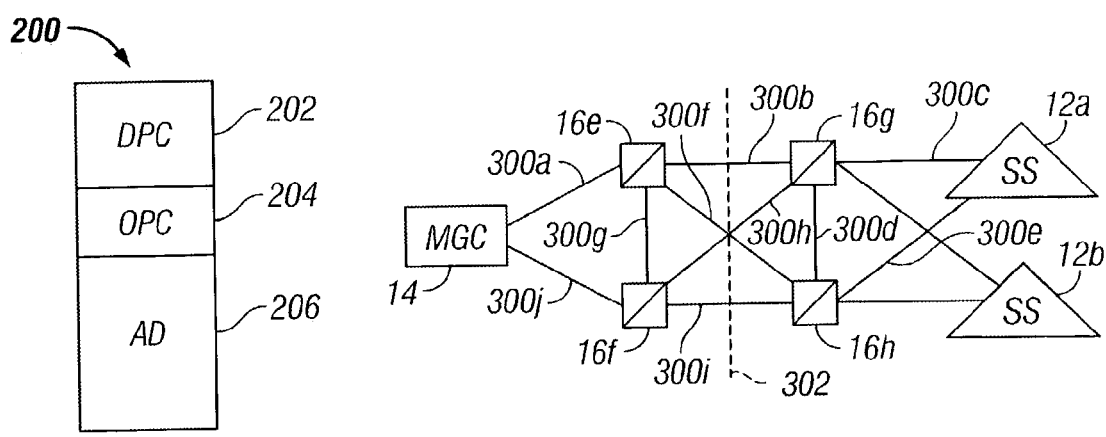
FIG. 2
FIG. 3

METHOD AND SYSTEM FOR PROVIDING SOFTSWITCH FAILURE PROTECTION IN A COMMUNICATION NETWORK

The present invention relates generally to communication systems and, more particularly, to a method and system for providing softswitch failure protection in a communication network.

BACKGROUND OF THE INVENTION

The use of communication systems through which to communicate data is an endemic part of modern society. For example, telephonic communication systems have been widely employed and are regularly utilized by a large number of users. Telephonic networks of various telephonic communication systems have been installed throughout significant portions of the populated areas of the world. Telephonic stations are connected to the telephonic network, such as by a wireline connection or a radio interface. A communication session is formed between two or more of the telephonic stations connected to the telephonic network. The telephonic station at which a call is originated may be referred to as the calling party, and the telephonic station at which the call is to be completed, or terminated, may be referred to as the called party.

In most conventional telephonic communication systems, circuit-switched connections are provided between endpoints, i.e., the calling and called parties, during a communication session. When a circuit-switched connection is formed, a dedicated channel is provided to permit the telephonic communications between the telephonic stations that form the endpoints of the communication sessions. For so long as the connection is maintained, telephonic communications between the calling and called parties are permitted. As the data to be communicated pursuant to the communication session might only be communicated intermittently, the communication capacity of the telephonic communication system may not be fully utilized for much of the communication session. Thus, in general, use of circuit-switched connections results in inefficient utilization of the communication capacity of a telephonic network.

Packet-switched communications, in contrast, are able more efficiently to utilize the communication capacity of a communication system. In a packet-based communication system, a common data path can be shared by two or more separate communication sessions. Because packet-formatted data can be communicated during discrete intervals, the same data path can be utilized during separate time periods to communicate packet-formatted data for different communication sessions. More efficient utilization of the communication capacity of the communication system in which the packet-based communication scheme is implemented is thereby possible.

Various packet formatting protocols are used when forming and sending data packets formed of digital data bits. One protocol scheme, the Internet protocol (IP) is regularly utilized in many different communication systems and communication applications. Communication devices constructed to send, receive, transport, and operate upon IP-formatted data can be configured together in a communication system to provide for the communication of IP-formatted data.

Improved telephonic communication systems now being developed include packet data networks through which packet-switched channels may be formed. Typically, gateways are coupled to the packet data network to allow communication between the packet data network and local networks. Thus, when communication from a local network comprises a different type of communication protocol from the protocol used in the packet data network, the gateway coupling the local network to the packet data network performs protocol translation, in addition to other operations such as voice encoding and the like.

Operational control of the telephonic communication system is carried out by a softswitch that functionally forms a part of, or is coupled to, the packet data network. The softswitch operates to control connection services of the gateways and to control call routing based on signaling information and database information related to the calling party and called party.

These improved telephonic networks include various redundancies, such as redundant softswitches, in order to continue providing communication when primary components malfunction or fail. For example, in the event of a communication link failure, conventional communication systems automatically switch to a backup communication link. For this approach, while the primary communication links to the primary softswitch and the primary softswitch itself are functioning properly, communication links to a backup softswitch are placed out of service. Disadvantages associated with this approach include continuous major alarm conditions on signal transfer points for the communication links to the backup softswitch, difficulty in managing the failed communication links, and the possibility of communication links failing while not being used and, therefore, being unavailable when traffic is applied.

SUMMARY OF THE INVENTION

In accordance with the present invention, a method and system for providing softswitch failure protection in a communication network are provided that substantially eliminate or reduce disadvantages and problems associated with conventional systems and methods. In particular, a single alias point code is used to identify both a primary and a backup softswitch and the backup softswitch may establish control before receiving diverted traffic in the event of a failure.

According to one embodiment of the present invention, a method for providing softswitch failure protection in a communication network is provided that includes assigning an alias point code to a first softswitch. The alias point code is also assigned to a second softswitch. A message is generated that comprises a destination point code that is operable to identify a destination for the message. The destination point code comprises the alias point code.

According to another embodiment of the present invention, a method for providing softswitch failure protection in a communication network is provided that includes assigning a first alias point code to a first softswitch. The first alias point code is also assigned to a second softswitch. A second alias point code is assigned to the first softswitch. The second alias point code is also assigned to the second softswitch. A first message is generated at a network element, such as a media gateway controller, that needs to communicate with the softswitch. The first message comprises a destination point code (DPC) that is operable to identify a destination for the first message. The destination point code comprises the first alias point code. The first message is sent to a signaling transfer point (STP). The signaling transfer point obtains the destination point code, determines an appropriate link set, and then routes the message to the softswitch indicated by the destination point code.

In a particular embodiment, the first message is directed by the signal transfer point to the first softswitch when the first softswitch is functioning and has control, and the first message is directed to the second softswitch when the first softswitch is malfunctioning and the second softswitch is functioning and has control.

In another particular embodiment, a second message is generated at a network element, such as a media gateway controller. The second message comprises a destination point code that is operable to identify a destination for the second message. The destination point code comprises the second alias point code. The second message is directed by the signal transfer point to the second softswitch when the second softswitch is functioning and has control, and the second message is directed to the first softswitch when the second softswitch is malfunctioning and the first softswitch is functioning and has control.

According to yet another embodiment of the present invention, a system for providing softswitch failure protection in a communication network is provided that includes a pair of signal transfer points, a first softswitch and a second softswitch. A network element (NE) is operable to generate a first message comprising a destination point code that is operable to identify a destination for the first message. The destination point code comprises a first alias point code. The signal transfer points are coupled to each other, and network elements with which they communicate. The first softswitch is coupled to the signal transfer points and is operable to be identified by the first alias point code. The second softswitch is coupled to the signal transfer points and is operable to be identified by the first alias point code.

According to still another embodiment of the present invention, a method for providing softswitch failure protection in a communication network is provided that includes sending a transfer allowed message comprising a first alias point code from a first softswitch to each of a plurality of the signaling transfer points of the pair. A transfer prohibited message comprising the first alias point code is sent from a second softswitch to each of the signaling transfer points of the pair. The first softswitch is monitored for failure. When the first softswitch fails, a transfer prohibited message comprising the first alias point code is sent from the first softswitch to each of the signaling transfer points, the second softswitch establishes control, and a transfer allowed message comprising the first alias point code is sent from the second softswitch to each of the signaling transfer points.

In a particular embodiment, a transfer allowed message comprising a second alias point code is sent from the second softswitch to each of a plurality of signaling transfer points. A transfer prohibited message comprising the second alias point code is sent from the first softswitch to each signaling transfer point. The second softswitch is monitored for failure. When the second softswitch fails, a transfer prohibited message comprising the second alias point code is sent from the second softswitch to each of the signaling transfer points, the first softswitch establishes control, and a transfer allowed message comprising the second alias point code is sent from the first softswitch to each of the signaling transfer points.

Technical advantages of one or more embodiments of the present invention include providing an improved method for providing softswitch failure protection in a communication network. In a particular embodiment, a single alias point code is used to identify both a primary and a backup softswitch. During normal operations, traffic directed to the alias point code is routed to the primary softswitch. However, in the event of a failure of the primary softswitch, the backup softswitch may establish control before allowing traffic directed to the alias point code to be routed to itself instead of the primary softswitch. As a result, signal transfer points for links to the backup softswitch will not have continuous major alarm conditions during normal operations.

In another particular embodiment, a set of trunking gateways (TGs) uses a first softswitch as a primary softswitch and a second softswitch as a secondary softswitch, while a different set of trunking gateways uses the second softswitch as a primary softswitch and the first softswitch as a secondary softswitch. For this embodiment, a single alias point code may be used to identify both the primary and secondary softswitches for one media gateway controller, while a different alias point code may be used to identify both the primary and secondary softswitches for the other media gateway controller. Because both softswitches are used as a primary softswitch, traffic is provided on all links during normal operation. As a result, secondary links used for backup for one softswitch are operationally utilized by the other softswitch for its 'primary' functions. That is, as each softswitch is primary for a set of trunking gateways assigned to it, then each softswitch shall be receiving live traffic associated with the trunking gateways that they control.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a communication system operable to provide softswitch failure protection in accordance with one embodiment of the present invention;

FIG. 2 is a block diagram illustrating a message format for call control messages communicated within the communication system of FIG. 1 in accordance with one embodiment of the present invention;

FIG. 3 is a block diagram illustrating potential routing paths for communicating call control messages within the communication system of FIG. 1 in accordance with one embodiment of the present invention.

DETAILED DESCRIPTION

Figure 4A:
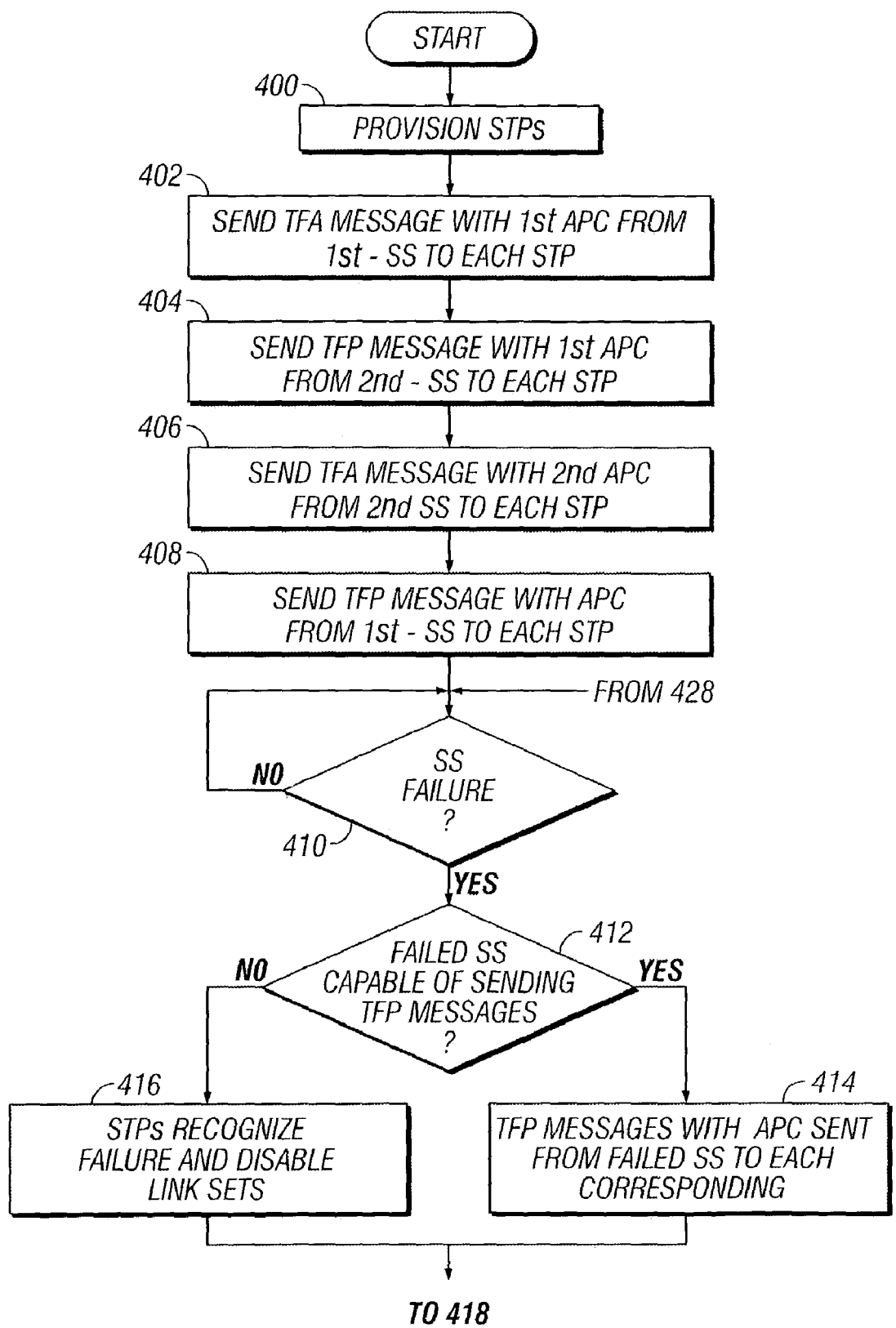
FIG. 4 is a flow diagram illustrating a method for providing softswitch failure protection in the communication system of FIG. 1 in accordance with one embodiment of the present invention.

FIG. 1 is a block diagram illustrating a communication system 10 operable to provide softswitch failure protection in accordance with one embodiment of the present invention. The communication system 10 may comprise a telephonic or other suitable communication system that is operable to provide communication between two or more communication devices (not shown in FIG. 1).

The communication system 10 comprises at least two softswitches (SSs) 12, a plurality of network elements (NEs) 14, a pair of interconnected signal transfer points (STPs) 16. An an optional call control network 18 is also shown in FIG.

1. The softswitches 12 and the network elements 14 are coupled to the signal transfer points 16 by links 30. For the embodiment with the call control network 18, the signal transfer points 16 are coupled to the call control network 18 by links 30. For an alternative embodiment without the call control network 18, some or all of the signal transfer points 16 may be coupled directly to each other by links 30. The communication system 10 also comprises a network management system (NMS) 20, a plurality of trunking gateways (TGs) 22, and a management network 24.

Each softswitch 12 is operable to control connection services for a plurality of trunking gateways 22, to select processes that may be applied to a call, to route a call based on signaling information and customer information, to transfer a call between network elements, and to interface to and support management functions, such as provisioning, fault management, billing, and the like. As used herein, "each" means every one of at least a subset of the identified items. According to one embodiment described in more detail below, the softswitches 12 are operable to control connection services for the trunking gateways 22 through the use of link set status messages.

According to one embodiment, the call control messages comprise signaling system number 7 (SS7) messages. For this embodiment, the links 30 comprise SS7 links. However, it will be understood that the call control messages may comprise any suitable control messages and the links 30 may comprise any suitable corresponding links without departing from the scope of the present invention.

The signal transfer points 16 are operable to route link set status messages and call control messages between network elements 14 and the softswitches 12. Thus, the signal transfer points 16 are operable to receive link set status messages from the softswitches 12 or from other signal transfer points 16 and to send the link set status messages to another signal transfer point 16 or to other network elements 14. In addition, the signal transfer points 16 are operable to receive call control messages from the network elements 14 or from other signal transfer points 16 and to send the call control messages to another signal transfer point 16 or to the softswitches 12. The signal transfer points 16 may be coupled directly to each other or may be coupled to each other through the call control network 18.

The network management system 20 is operable to prompt the softswitches 12 to send link set status messages to the signal transfer points 16 in addition to being operable to perform other suitable management functions for the communication system 10. For example, based on a signal from the network management system 20, a softswitch 12 may send "transfer allowed" messages to designate the status of a destination over particular link sets as allowed and may send "transfer prohibited" messages to designate the status of particular link sets as prohibited.

Each trunking gateway 22 is operable to couple a public switched telephone network (PSTN) to a softswitch 12 through the management network 24. The management network 24 is operable to couple the network management system 20 to the softswitches 12 and the trunking gateways 22.

In operation, network elements may send call control messages to a softswitch 12 using a destination point code to identify the softswitch 12 as the destination. As described below in connection with FIGS. 2 and 4, a single alias point code is used to identify both a primary and a backup softswitch 12. Thus, for example, a network element 14a may send a call control message using an alias point code that also identifies the backup softswitch 12b. The signaling transfer point directs the message to the currently active softswitch. Based on the functionality of the softswitches 12, the messages may be routed to the appropriate softswitch 12. Therefore, using the same example, traffic directed to the alias point code is routed to the primary softswitch 12a during normal operations. However, in the event of a failure of the primary softswitch 12a, the backup softswitch 12b may establish control and then begin receiving the traffic directed to the alias point code.

FIG. 2 is a block diagram illustrating a message format 200 for call control messages communicated within the communication system 10 in accordance with one embodiment of the present invention. For this embodiment, the message format 200 comprises a destination point code (DPC) 202, an origination point code (OPC) 204, and additional data (AD) 206. Each component capable of communicating using the call control messages, such as the softswitches 12 and the media gateway controllers 14, has an associated point code that is operable to identify that component. Thus, each message 200 comprises data to identify the destination for the message 200, such as a softswitch 12 or a network element 14, data to identify the originator of the message 200, such as a softswitch 12 or a network element 14, and additional data, such as call control data and/or other suitable information.

In accordance with one embodiment of the present invention, a single point code, called an alias point code, is used to identify two softswitches 12. However, it will be understood that the single alias point code may be used to identify any suitable number of softswitches 12 without departing from the scope of the present invention. Using the alias point code as a destination point code 202, a network element 14 may send a message 200 for either of the softswitches 12 identified by that alias point code. Based on the functionality of those softswitches 12, the message 200 may be routed by signal transfer points 16 to the appropriate softswitch 12 identified by the alias point code according to the signaling transfer point's routing.

FIG. 3 is a block diagram illustrating potential routing paths 300 for communicating call control messages within the communication system 10 in accordance with one embodiment of the present invention. For the illustrated example, a call control message may be sent from the network element 14 to the softswitch 12a-via any one of a number of routing paths 300. Each component 14, 16 along the path 300 may have one or more primary paths and one or more secondary paths. In addition, for one embodiment, the routing paths 300 may traverse a network boundary 302 between signal transfer points 16.

For example, with respect to the network element 14, a primary path for sending a call control message to the softswitch 12a may comprise either path 300a to the signal transfer point 16e or path 300j to the signal transfer point 16f With respect to the signal transfer point 16e, a primary path may comprise either path 300b to the signal transfer point 16g or path 300f to the signal transfer point 16h, while a secondary path may comprise path 300g to the signal transfer point 16f With respect to the signal transfer point 16g, a primary path may comprise path 300c to the softswitch 12a, while a secondary path may comprise path 300d to the signal transfer point 16h.

Thus, in operation, the call control message may be routed from the network element 14 along primary paths, when available, and along a secondary path, when any primary path is unavailable, in order to reach the softswitch 12a. For the illustrated example, when all the primary paths are available, the media gateway controller 14 sends the call control message to either the signal transfer point 16*e* or the signal transfer point 16*f*. Assuming the network element 14 sends the call control message to the signal transfer point 16*e* along path 300*a*, the signal transfer point 16*e* sends the call control message to either the signal transfer point 16*g* or the signal transfer point 16*h*. Assuming the signal transfer point 16*e* sends the call control message to the signal transfer point 16*g* along path 300*b*, the signal transfer point 16*g* sends the call control message to the softswitch 12*a* along path 300*c*.

However, if the primary path 300*c* from the signal transfer point 16*g* to the softswitch 12*a* is unavailable, the signal transfer point 16*g* may send the call control message to the signal transfer point 16*h* along the secondary path 300*d*, which may then send the call control message to the softswitch 12*a* along path 300*e*. In addition, if the primary path 300*b* from the signal transfer point 16*e* to the signal transfer point 16*g* and the primary path 300*f* from the signal transfer point 16*e* to the signal transfer point 16*h* are unavailable, the signal transfer point 16*e* may send the call control message to the signal transfer point 16*f* along the secondary path 300*g*, which may then send the call control message to either the signal transfer point 16*g* along path 300*h* or the signal transfer point 16*h* along path 300*i*. In this way, using primary paths when available and secondary paths as backup, the call control messages are sent from the media gateway controller 14 to the softswitch 12*a*.

Figure 4B:
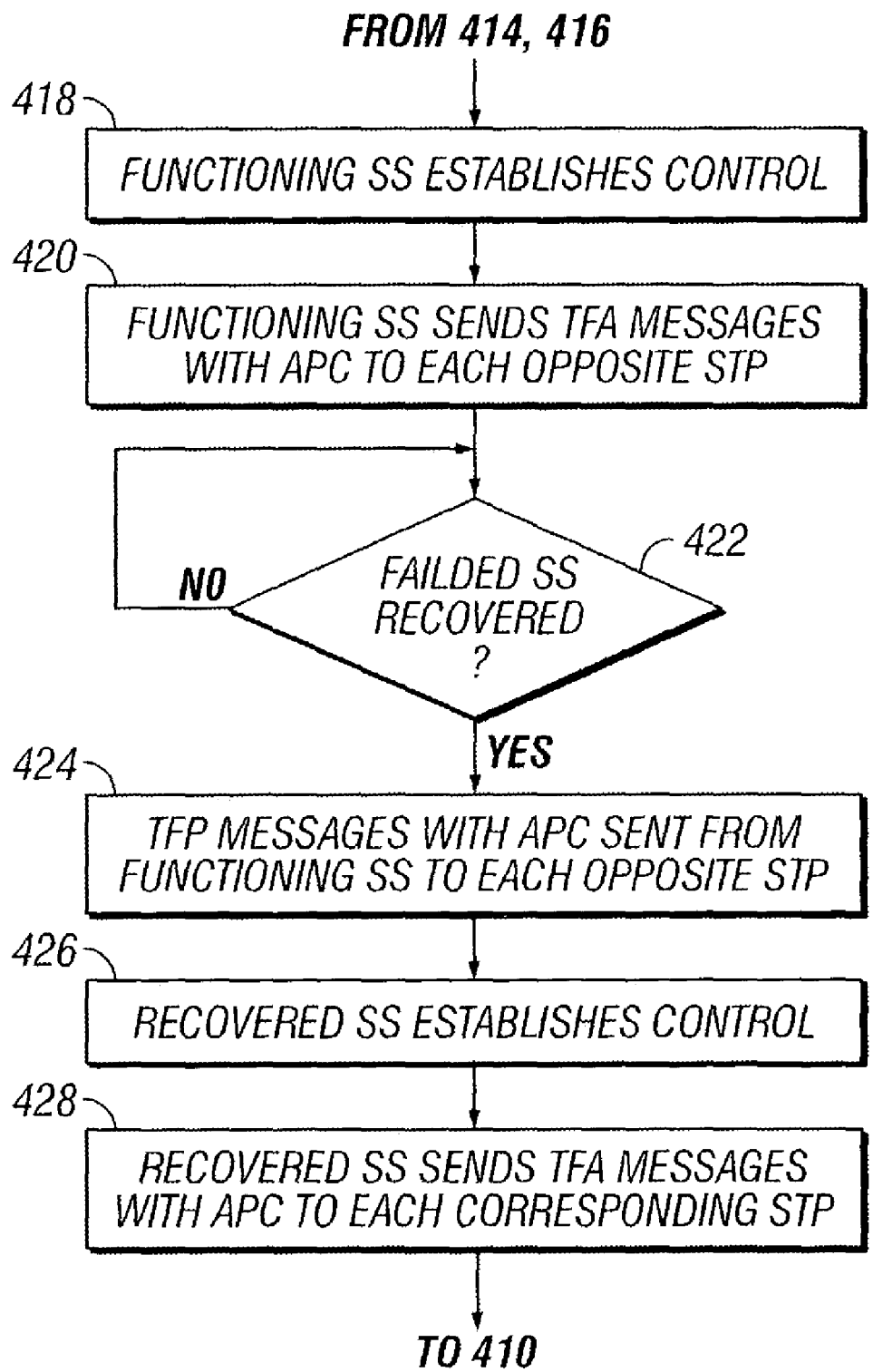

FIG. 4 is a flow diagram illustrating a method for providing softswitch failure protection in the communication system 10 in accordance with one embodiment of the present invention. According to one embodiment, first and second softswitches 12 are used and are labeled 'a' and 'b', respectively. It will be understood, however, that any suitable number of softswitches 12 may be used without departing from the scope of the present invention.

For a first embodiment, each trunking gateway 22, which may be labeled first trunking gateway, may use the first softswitch 12 as a primary softswitch 12 and the second softswitch 12 as a secondary softswitch. For a second embodiment, trunking gateways 22 are grouped into two categories: first and second. It will be understood, however, that the trunking gateways may be grouped into any suitable number of categories, corresponding to the number of softswitches 12 used, without departing from the scope of the present invention. For this embodiment, each first trunking gateway uses the first softswitch 12 as a primary softswitch 12 and the second softswitch 12 as a secondary softswitch, while each second trunking gateway 14 uses the second softswitch 12 as a primary softswitch 12 and the first softswitch 12 as a secondary softswitch.

The method begins at step 400 where the signal transfer points 16 are provisioned. At step 402, the first softswitch 12 sends a transfer allowed message with a first alias point code to each signaling transfer point in order to set the routing status for the link sets from the signaling transfer point to the first softswitch 12 to allowed. At step 404, the second softswitch 12 sends a transfer prohibited message with the first alias point code to each signaling transfer point in order to set the status for the link sets from the signaling transfer point to the second softswitch 12 to prohibited.

At optional step 406, the second softswitch 12 sends a transfer allowed message with a second alias point code to each signaling transfer point in order to set the status for the link sets from the signaling transfer points to the second softswitch 12 to allowed. At optional step 408, the first softswitch 12 sends a transfer prohibited message with the second alias point code to each signaling transfer point in order to set the status for the link sets from the signaling transfer points to the first softswitch 12 to prohibited. It will be understood that the optional steps 406 and 408 may be included for the embodiment in which the first softswitch 12 comprises the primary softswitch 12 for one set of trunking gateways (the first trunking gateways) 22 and the second softswitch 12 comprises the primary softswitch 12 for another set of trunking gateways (the second trunking gateways) 22, while the first softswitch 12 comprises the secondary softswitch 12 for the second trunking gateways and the second softswitch 12 comprises the secondary softswitch 12 for the first trunking gateways.

At decisional step 410, a determination is made regarding whether or not a softswitch failure has occurred. This determination may be made by the failed softswitch 12, the network management system 20, the signal transfer points 16, or any other suitable component. If a softswitch failure has not occurred, the method follows the No branch and remains at decisional step 410. Thus, normal operation continues while the softswitches 12 are monitored for failure. However, if a softswitch failure has occurred, the method follows the Yes branch from decisional step 410 to decisional step 412.

At decisional step 412, a determination is made regarding whether or not the failed softswitch 12 is capable of sending transfer prohibited messages. If the failed softswitch 12 is capable of sending transfer prohibited messages, the method follows the Yes branch from decisional step 412 to step 414. At step 414, the failed softswitch 12 sends transfer prohibited messages with the corresponding alias point code to each corresponding, adjacent signaling transfer point in order to set the status for the signaling transfer points from the corresponding signaling transfer points to the failed softswitch 12 to prohibited.

Returning to decisional step 412, if the failed softswitch 12 is incapable of sending transfer prohibited messages, the method follows the No branch from decisional step 412 to step 416. At step 416, the signal transfer points 16 recognize the softswitch failure and disable the link sets for the failed softswitch 12. From steps 414 and 416, the method continues to step 418.

At step 418, the functioning softswitch 12 establishes control. According to one embodiment, the functioning softswitch 12 establishes control by taking control of the trunking gateways 22. However, it will be understood that the functioning softswitch 12 may establish control by performing any suitable operations to ensure its ability to function properly as a backup softswitch 12 for the failed softswitch 12. At step 420, the functioning softswitch 12 sends transfer allowed messages with the opposite alias point code to each signaling transfer point in order to set the status for the link sets to allowed, i.e., to change control of the trunking gateways from the old softswitch to the new softswitch.

At decisional step 422, a determination is made regarding whether or not the failed softswitch 12 has recovered. This determination may be made by the failed softswitch 12, the network management system 20, or any other suitable component. According to one embodiment, the softswitch 12 may recover spontaneously or may recover due to manual or automatic repair. If the failed softswitch 12 has not recovered, the method follows the No branch and remains at decisional step 422. Thus, operation continues with the functioning softswitch 12 acting as the backup softswitch 12 for the failed softswitch 12 until the failed softswitch 12 recovers.

Once the failed softswitch 12 recovers, the method follows the Yes branch from decisional step 422 to step 424. At step 424, the functioning softswitch 12 that was acting as a backup softswitch 12 sends transfer prohibited messages with the opposite alias point code to each signaling transfer point in order to set the status for the link sets to prohibited.

At step 426, the recovered softswitch 12 establishes control. According to one embodiment, the recovered softswitch 12 establishes control by taking control of the trunking gateways 22. However, it will be understood that the recovered softswitch 12 may establish control by performing any suitable operations to ensure its ability to function properly as a softswitch 12. At step 428, the recovered softswitch 12 sends transfer allowed messages with the corresponding alias point code to each corresponding signaling transfer point in order to set the status for the link sets from the corresponding signaling transfer point to the recovered softswitch 12 to allowed. The method then returns to decisional step 410 where the softswitches 12 continue to be monitored for failure.

In this way, traffic directed to the alias point code is routed to the primary softswitch 12, for example the softswitch 12a, during normal operations. However, in the event of a failure of the primary softswitch 12a, the backup softswitch 12b is able to establish control before allowing traffic directed to the alias point code to be routed to itself instead of the primary softswitch 12a. As a result, signal transfer points 16 for links to the backup softswitch 12b will not have continuous major alarm conditions during normal operations. The signaling transfer points control routing of the traffic based upon which of the soft switches 12a and 12b are to be the primary softswitch. The transfer allowed (TFA) and transfer prohibited (TFP) messages selectably sent by the respective softswitches are determinative of the routing of the traffic. The trunking gateways each have associated therewith primary and backup softswitches. And, responsive to the assignments of the softswitches either to be primary or backup, traffic is routed, as appropriate, pursuant to communication operations performed by the communication system.

Although the present invention has been described with several embodiments, various changes and modifications may be suggested to one skilled in the art. It is intended that the present invention encompass such changes and modifications as fall within the scope of the appended claims.

What is claimed is:

1. A method for providing softswitch failure protection in a communication network having a first softswitch and at least a second softswitch, the first and second softswitches selectably operable to perform control services at least at a selected part of the communication network, said method comprising:
assigning an alias point code to the first softswitch;
assigning the alias point code to the second softswitch; and
generating a message comprising a destination point code that identifies a destination for the message, the destination point code comprising the alias point code.

2. The method of claim 1, further comprising directing the message generated during said operation of generating to the first softswitch when the first softswitch is functioning and has control to perform the control services at the selected part of the communication network.

3. The method of claim 1, further comprising directing the message to the second softswitch when the first softswitch is malfunctioning and the second softswitch is functioning and has control to perform the control services at the selected part of the communication network.

4. The method of claim 1, wherein said operation of generating a message comprises generating a message at a network element.

5. The method of claim 4, wherein the message comprises a signaling system number 7 message.

6. A method for providing softswitch failure protection in a communication network having a first softswitch and a second softswitch, the first softswitch and the second softswitch selectably operable to provide control service at least at a selected portion of the communication network, said method comprising:
assigning a first alias point code to a first softswitch;
assigning the first alias point code to a second softswitch;
assigning a second alias point code to the first softswitch;
assigning the second alias point code to the second softswitch;
generating a first message at a first network element, the first message comprising a destination point code operable to identify a destination for the first message, the destination point code comprising the first alias point code.

7. The method of claim 6, further comprising directing the first message to the first softswitch when the first softswitch is functioning and has control to provide the control service at least at the selected part of the communication network.

8. The method of claim 6, further comprising directing the first message to the second softswitch when the first softswitch is malfunctioning and the second softswitch is functioning and has control to provide the control service at least at the selected part of the communication network.

9. The method of claim 6, further comprising generating a second message at a second network element, the second message comprising a destination point code operable to identify a destination for the second message, the destination point code comprising the second alias point code.

10. The method of claim 9, further comprising directing the second message to the second softswitch when the second softswitch is functioning and has control.

11. The method of claim 9, further comprising directing the second message to the first softswitch when the second softswitch is malfunctioning and the first softswitch is functioning and has control.

12. The method of claim 9, the first and second messages generated during said operations of generating the first and second messages, respectively, comprise signaling system number 7 messages.

13. A system for providing softswitch failure protection in a communication network, said system comprising:
a first network element operable to generate a first message comprising a destination point code that is operable to identify a destination for the first message, the destination point code comprising a first alias point code;
a plurality of signal transfer points coupled to the first network element,
a first softswitch coupled to the signal transfer points, the first softswitch operable to be identified by the first alias point code; and
a second softswitch coupled to the signal transfer points, the second softswitch operable to be identified by the first alias point code.

14. The system of claim 13, wherein the signal transfer points are operable to direct the first message to the first softswitch when the first softswitch is functioning and has control.

15. The system of claim 13, the signal transfer points operable to direct the first message to the second softswitch when the first softswitch is malfunctioning and the second softswitch is functioning and has control.

16. The system of claim 13, further comprising:
a second network element coupled to the signal transfer points, the second media gateway controller operable to generate a second message comprising a destination point code that is operable to identify a destination for the second message, the destination point code comprising a second alias point code;
the first softswitch further operable to be identified by the second alias point code; and
the second softswitch further operable to be identified by the second alias point code.

17. The system of claim 16, the signal transfer points operable to direct the second message to the second softswitch when the second softswitch is functioning and has control.

18. The system of claim 16, the signal transfer points operable to direct the second message to the first softswitch when the second softswitch is malfunctioning and the first softswitch is functioning and has control.

19. A method for providing softswitch failure protection in a communication network, said method comprising:
sending a transfer allowed message comprising a first alias point code from a first softswitch to each of a plurality of adjacent signaling transfer points;
sending a transfer prohibited message comprising the first alias point code from a second softswitch to each of the adjacent signaling transfer points;
monitoring the first softswitch for failure; and
if the first softswitch fails,
sending a transfer prohibited message comprising the first alias point code from the first softswitch to each of the adjacent signaling transfer points,
establishing control with the second softswitch, and
sending a transfer allowed message comprising the first alias point code from the second softswitch to each of the adjacent signaling transfer points.

20. The method of claim 19, further comprising:
sending a transfer allowed message comprising a second alias point code from the second softswitch to each of a plurality of adjacent signaling transfer points;
sending a transfer prohibited message comprising the second alias point code from the first softswitch to each of the adjacent signaling transfer points;
monitoring the second softswitch for failure; and
if the second softswitch fails,
sending a transfer prohibited message comprising the second alias point code from the second softswitch to each of the adjacent signaling transfer points,
establishing control with the first softswitch, and
sending a transfer allowed message comprising the second alias point code from the first softswitch to each of the adjacent signaling transfer points.

* * * * *